E. W. & E. V. SMITH.
TRANSMISSION GEARING FOR MOTOR VEHICLES.
APPLICATION FILED JAN. 3, 1916.
1,195,285.
Patented Aug. 22, 1916.
2 SHEETS—SHEET 1.
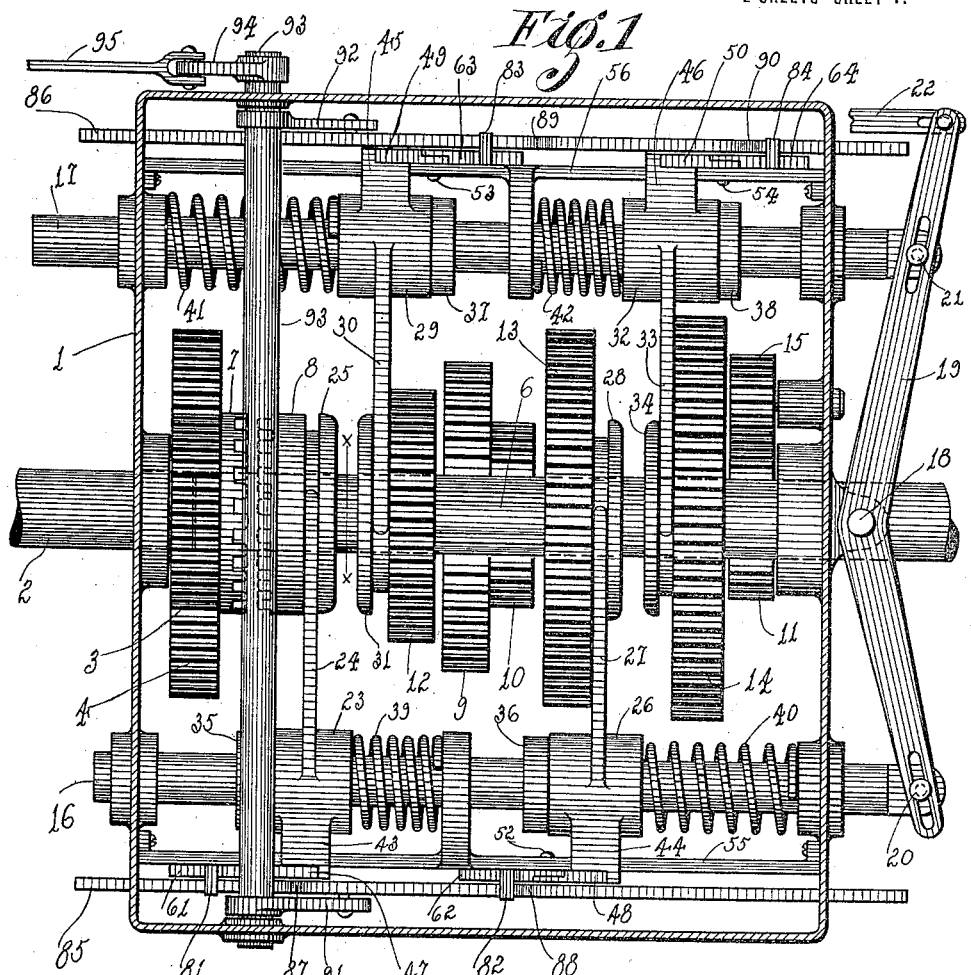
WITNESS:
Floyd M. Blanchard
INVENTORS.
Earl W. Smith
Eugene V. Smith
BY
ATTORNEY.

E. W. & E. V. SMITH.
TRANSMISSION GEARING FOR MOTOR VEHICLES.
APPLICATION FILED JAN. 3, 1916.
1,195,285.
Patented Aug. 22, 1916.
2 SHEETS—SHEET 2.
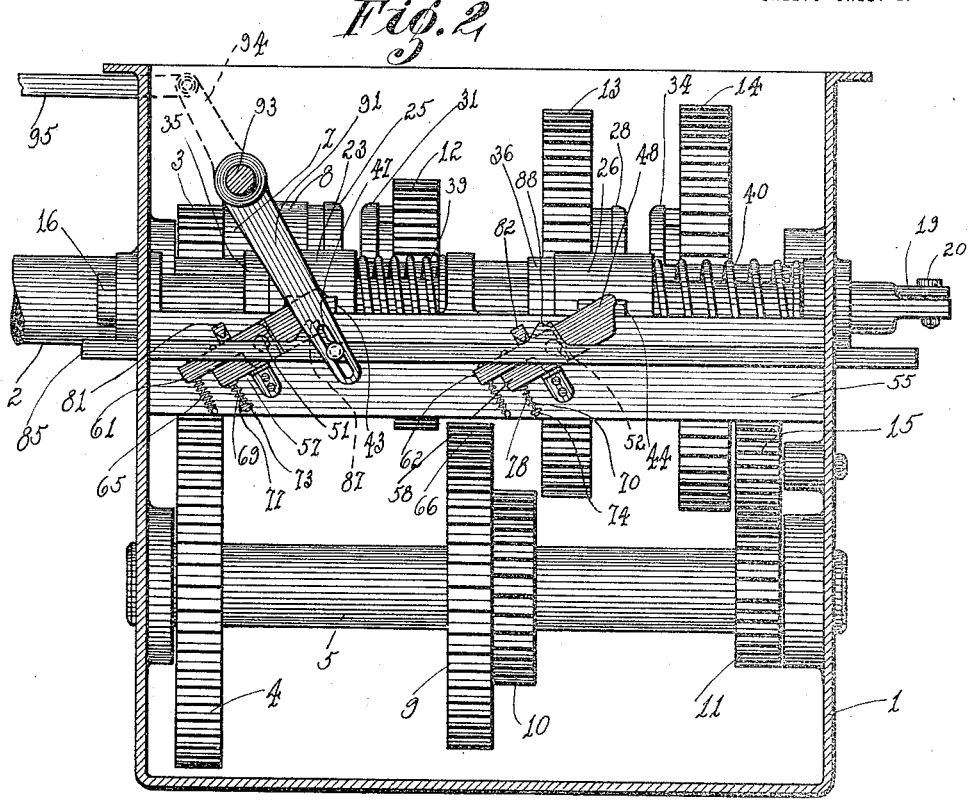
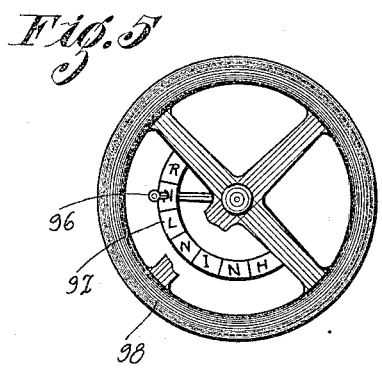
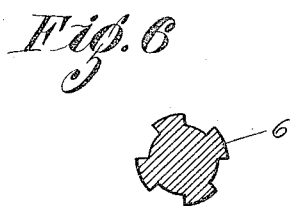
WITNESS:
Floyd M. Blanchard
INVENTORS.
Earl W. Smith
Eugene V. Smith
By Percy Webster
ATTORNEY

UNITED STATES PATENT OFFICE.

EARL W. SMITH AND EUGENE V. SMITH, OF SACRAMENTO, CALIFORNIA.

TRANSMISSION-GEARING FOR MOTOR-VEHICLES.

1,195,285.     Specification of Letters Patent.     Patented Aug. 22, 1916.

Application filed January 3, 1916. Serial No. 69,772.

*To all whom it may concern:*

Be it known that we, EARL W. SMITH and EUGENE V. SMITH, citizens of the United States, residents of Sacramento, in the county of Sacramento, State of California, have invented certain new and useful Improvements in Transmission-Gearing for Motor-Vehicles; and we do declare the following to be a full, clear, and exact description of the same, reference being had to the accompanying drawings, and to the characters of reference marked thereon, which form a part of this application.

This invention relates to improvements in the transmission gearing used in connection with motor vehicles, the object of the invention being to produce a gearing provided with a pre-selector whereby a gear change may be selected while one set of transmission elements are in connection with each other and upon a subsequent operation of the clutch of the vehicle those in connection may be thrown out of connection and the selected gears may be thrown into connection with each other, the gears at all times moving to neutral position before a gear change takes place.

The main details of the mechanism as herein disclosed are shown in our pending application for patent filed October 18th, 1915, Serial Number 56,351, the present invention relating to certain improvements in the structure, and especially, we have substituted for the clutch mechanism shown in the above identified application, a system of direct gear changes. We have also in the present application improved the tripping mechanism and have generally simplified and condensed the necessary structure for carrying out the theme of our invention.

A further object of the invention is to produce a simple and inexpensive device and yet one which will be exceedingly effective for the purposes for which it is designed.

These objects we accomplish by means of such structure and relative arrangement of parts as will fully appear by a perusal of the following specification and claim.

In the drawings similar characters of reference indicate corresponding parts in the several views.

Figure 1 is a top plan view of the complete gear mechanism as it appears when the clutch of the motor vehicle is disengaged from the driving shaft of the motor. Fig. 2 is a side elevation of the same. Fig. 3 is a side elevation of the tripping dog mechanism as it appears when in normal engaging position with the gear changing mechanism. Fig. 4 is a similar view of the same when a gear selection has been made and before the gears have been changed in accordance with the selection. Fig. 5 is a view showing the selector lever as it appears when mounted on the steering wheel of the vehicle. Fig. 6 is a sectional view taken on a line X—X of Fig. 1.

Referring now more particularly to the characters of reference on the drawings the numeral 1 designates the gear case suitably journaled in which is the driving shaft 2 leading from the motor of the vehicle, which shaft 2 projects into the case 1. Keyed to the inner end of the shaft 2 is the pilot pinion 3 of the gear mechanism which pilot gear is in continual operative connection with the large gear 4 secured to the intermediate shaft 5 suitably journaled in the gear case 1.

The numeral 6 designates the driven shaft journaled at one end in the gear case and at its other end being turnable within the gear 3. On the face of the gear 3 is a clutch 7 while on the shaft 6 is slidably keyed another clutch 8 arranged to be brought into engagement with the clutch 7 for direct driving connection from the shaft 2 to the shaft 6 in that selection of gears commonly called high gear. This clutch 8 is normally held out of engagement with the clutch 7 and is only brought into contact therewith by the operation of the herein described mechanism as will presently appear.

Keyed onto the shaft 5 are gears 9, 10 and 11. Slidably keyed on the shaft 6 are gears 12, 13 and 14. The gears 12 and 13 are arranged to be brought into engagement with the gears 9 and 10 respectively for producing those gear selections commonly known as intermediate and low gear respectively. The gear 14 is arranged to be brought into connection with an intermediate gear 15 engaging the gear 11 for producing that gear selection commonly called reverse gear.

In normal neutral position all of the gears 12, 13 and 14 are out of connection with their corresponding gears and are only brought into connection therewith when desired, and this is accomplished by means of our improved gear selecting and changing structure which is substantially constructed and operated as follows, viz:

Slidably journaled in the gear case 1 on each side of the gears are shafts 16 and 17 respectively. Fulcrumed centrally on the outside of the gear case 1, as at 18, is a bell crank 19 flexibly connected as at 20, with the shaft 16 and as at 21 with the shaft 17. A link 22 connects one end of the bell crank 21 with the clutch lever (not shown). Slidable on the shaft 16 is a block 23 having a projecting yoke 24 engaging a collar 25 on the clutch 8 leaving the collar free to turn within the yoke. Another block 26 is slidable on the shaft 16 and has a yoke 27 similarly engaging a collar 28 on the gear 13. Similarly on the shaft 16 is a block 29 having a yoke 30 engaging a collar 31 on the gear 12. Still another block 32 is slidable on the shaft 17 and has a yoke 33 engaging a collar 34 on the gear 14. On the shafts 16 and 17 are stops 34, 35, 36, 37 and 38 adapted to limit the movement of the blocks 23, 26, 29 and 32 respectively under the action of their springs 39, 40, 41 and 42 respectively, these springs being suitably positioned to act against the said members 23, 26, 29 and 32 substantially as shown in the drawings. On each of the members 23, 26, 29 and 32 are projecting lugs 43, 44, 45 and 46 respectively, normally engageable by tripping dogs 47, 48, 49 and 50 respectively, which engagement by the said tripping dogs holds the blocks 23 to 32 respectively in such position that their corresponding gear connections are held in such position as to be in no selected driving position, or in such position as to form no connection between the driving shaft 2 and driven shaft 6.

The dogs 47 to 50 are pivotally mounted on pins 51, 52, 53, and 54 respectively mounted on plates 55 and 56 suitably secured within the gear case 1. Such dogs 47 to 50 respectively have projecting shoulders 57, 58, 59 and 60 respectively while the numerals 61, 62, 63 and 64 designate levers fulcrumed on the pins 51 to 54 respectively and each being provided with a pulling spring 65 to 68 respectively, the action of which springs normally pulls the levers 61 to 64 against the shoulders 57 to 60 respectively of the dogs 47 to 50 respectively to cause the said dogs and levers to each act as a single unit to engage the lugs 43 to 46 respectively for the purposes noted. Through each of the shoulders 57 to 60 respectively and the corresponding levers 61 to 64 respectively are pins 69 to 72 respectively, such pins being capable of a slight lateral movement through the said shoulders. There are collars 73 to 76 respectively on the ends of the pins 69 to 72 with springs 77 to 80 interposed between said collars and the shoulders, the action of said springs normally tending to hold the said shoulders into contact with the said levers. On each of the levers 61 to 64 are cams 81 to 84 respectively which overhang sliding bars 85 and 86 which we will refer to as the selecting bars, such bars having upwardly projecting tripping cams 87, 88, 89 and 90, each of these tripping cams representing the point of selection for high gear, low gear, intermediate and reverse gear respectively. These selecting bars 85 and 86 are arranged to be operated by arms 91 and 92 secured to a shaft 93 suitably journaled in the gear case 1 and connected by means of an arm 94 with a push rod 95 operatively connected with the selecting lever 96 on the selector indicator 97 arranged near the steering wheel 98.

When the gears are in neutral position the tripping dogs 47 to 50 respectively are in engagement with their respective lugs 43 to 46 in which position all of the gears are held from engagement with each other so that there is no driving relation between the shaft 2 and the shaft 6. Assuming that reverse gear is to be selected and connected, the operator moves the lever 96 to the point indicated as R on the member 97. When this is done the cam 90 is moved through the mechanism disclosed to engage the cam 84. This action moves the lever 64 on its pivotal point 54 and compresses the spring 80 and extends the spring 68. During this operation the dog 50 being in frictional engagement with the lug 46, can have no movement. The clutch is then thrown out which causes the rod 22 to move the bell crank 19 and slide the shafts 16 and 17 so that all the stop members 35 to 38 respectively act against the blocks 23, 26, 29 and 32 to move them against their corresponding springs 39 to 42. This action moves all the lugs 43 to 46 out of engagement with their corresponding tripping dogs 47 to 50 respectively. All of the dogs which are not under the influence of one of the tripping cams on the sliding selecting bars are held in their normal position by means of their springs 65, 66 and 67. The remaining lever 64 being held by the cam 90 in horizontal position and with its spring 68 extended, this leaves the space between the lug 60 and the lever 64 as shown clearly in Fig. 4. Thus when the lug 46 moves away from the dog 50 and releases such dog 50 from frictional engagement, the action of the compressed spring 80 against the shoulder 60 moves the said dog 50 on its pivotal point 54 in horizontal alinement with the lever 64. This removes the dog 50 from the path of the lug 46. Then, when the clutch is allowed to move to closed position again, the lugs 43, 44 and 45 move back into engagement with their corresponding tripping dogs holding their respective gears still in neutral position. The path of the lug 46 however being free when the stop 38 is removed from the path of the block 32, the action of the spring 42 forces the said block freely forward and consequently moves the gear 14 into engagement with the gear 15 which is being driven by the gear 11. Consequently motion is imparted from the shaft 2 through the gear 3, gear 4, shaft 5, gear 11, gear 15, and gear 14 to the shaft 6 giving the desired reverse motion to the said shaft 6. When, however, the selecting rod 86 is again moved and the cam 90 moved out of engagement with the cam 84 the action of the spring 68 tends to move the lever 64 and dog 50 as a unit to direct the said dog 50 into the path of the lug 46 and with a subsequent motion of the clutch the said block 32 will be moved to disengage the gear 14 from the gear 15 and upon resuming normal position the lug 50 will bar the path of the lug 46 and hold the said gear 14 disengaged from the gear 15. At the same time another selection may be made with the lever 96 causing a similar action with the other parts of the mechanism to throw the low, intermediate or high gears into their respective operative positions as will be apparent without further detailed description.

The tripping cams on the sliding selector bars are so positioned that no two of the tripping mechanisms can be operated at one time and also the parts will always be moved to neutral position before a subsequent gear selection can be made this being accomplished by the positioning of the tripping cams on the said sliding selecting bars.

As can readily be seen from the foregoing description the invention so disclosed is very similar to that disclosed in the above identified application for patent with the exception that we shift the gears directly instead of having dependent clutches and also our tripping and selecting mechanism is much improved to give more efficient action. Also it can readily be seen that we have produced such a device as substantially fulfils the object of the invention as set forth herein.

While this specification sets forth in detail the present and preferred construction of the device, still in practice such deviations from such detail may be resorted to as do not form a departure from the spirit of the invention, as defined by the appended claim.

Having thus described our invention what we claim as new and useful and desire to secure by Letters Patent is:

The combination with a driving and driven transmission element, of a sliding member connected with one element and arranged to be moved to place said elements in driving relation with each other, a dog pivotally mounted independently of said sliding member and normally engaging same to hold said elements out of driving relation with each other, a shoulder on said dog, a spring pulled lever pivoted on said dog and engageable with said shoulder, a spring pulled pin projecting through the shoulder and engaging said lever, and means for engaging said lever to move it on its pivotal point, as described.

In testimony whereof, we affix our signatures.

EARL W. SMITH.
EUGENE V. SMITH.